(12) United States Patent
Miller et al.

(10) Patent No.: US 9,462,447 B2
(45) Date of Patent: Oct. 4, 2016

(54) METHODS AND SYSTEMS FOR ALLOCATING RESOURCES FROM COMPONENT CARRIERS TO A PUBLIC-SAFETY MOBILE RADIO

(71) Applicant: MOTOROLA SOLUTIONS, INC., Schaumburg, IL (US)

(72) Inventors: Trent J. Miller, West Chicago, IL (US); Mario F. Derango, Cary, IL (US); David P. Helm, Carol Stream, IL (US); Gino A. Scribano, Saint Charles, IL (US); Paul D. Steinberg, Wayne, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 105 days.

(21) Appl. No.: 14/530,215

(22) Filed: Oct. 31, 2014

(65) Prior Publication Data
US 2016/0128065 A1    May 5, 2016

(51) Int. Cl.
*H04W 4/00* (2009.01)
*H04W 4/22* (2009.01)
*H04W 72/10* (2009.01)
*H04L 5/00* (2006.01)

(52) U.S. Cl.
CPC ............. *H04W 4/22* (2013.01); *H04L 5/0069* (2013.01); *H04L 5/0076* (2013.01); *H04W 72/10* (2013.01); *H04L 5/001* (2013.01); *H04L 5/0044* (2013.01)

(58) Field of Classification Search
CPC . H04W 72/0453; H04W 4/22; H04W 72/10; H04L 5/0076; H04L 5/0069; H04L 5/001; H04L 5/0044
See application file for complete search history.

(56) References Cited

U.S. PATENT DOCUMENTS

| | | | |
|---|---|---|---|
| 9,055,571 B2* | 6/2015 | Suzuki | |
| 2005/0143048 A1* | 6/2005 | Binning | H04L 12/66 455/404.2 |
| 2009/0054029 A1* | 2/2009 | Hogberg | H04L 41/5006 455/404.2 |
| 2010/0316034 A1* | 12/2010 | Burbidge | H04W 36/0022 370/338 |
| 2011/0294435 A1 | 12/2011 | Miller et al. | |
| 2012/0113914 A1 | 5/2012 | Zhao et al. | |

(Continued)

FOREIGN PATENT DOCUMENTS

| AU | 2010261246 A1 | 1/2012 |
|---|---|---|
| CA | 2 805 607 A1 | 1/2012 |

(Continued)

OTHER PUBLICATIONS

The International Search Report and Written Opinion, PCT/US2015/051654, filed: Sep. 23, 2015, all pages.

*Primary Examiner* — Robert Wilson

(57) ABSTRACT

Disclosed herein are methods and systems for allocating resources from component carriers to a public-safety mobile radio. An embodiment takes the form of a process that is carried out by carried out by a Long-Term Evolution (LTE) Evolved Node B (eNodeB). The eNodeB makes a first determination to allocate resources to a given mobile radio. The eNodeB makes a second determination that the given mobile radio is a public-safety mobile radio. In response to making the first and second determinations, the eNodeB selects, based on one or more public-safety-communication criteria, a component carrier from among a plurality of component carriers managed by the eNodeB. The eNodeB allocates resources on the selected eNodeB component carrier to the given mobile radio.

18 Claims, 4 Drawing Sheets

(56) References Cited

U.S. PATENT DOCUMENTS

| | | |
|---|---|---|
| 2012/0238308 A1 | 9/2012 | Brunel et al. |
| 2013/0079009 A1 | 3/2013 | Aumann et al. |
| 2013/0190003 A1* | 7/2013 | Smith ............... H04W 72/0453 455/452.1 |
| 2014/0044068 A1 | 2/2014 | Jung et al. |
| 2014/0071946 A1 | 3/2014 | Terry et al. |
| 2014/0177437 A1* | 6/2014 | Korus ................... H04W 76/00 370/230 |
| 2014/0329517 A1* | 11/2014 | Van Phan ........... H04W 76/023 455/418 |
| 2015/0109995 A1* | 4/2015 | Mathai .................. H04W 48/18 370/328 |
| 2015/0310730 A1* | 10/2015 | Miller .................. G08B 27/001 340/539.13 |
| 2015/0334574 A1* | 11/2015 | Krishnamoorthy ... H04W 16/14 370/329 |
| 2016/0021520 A1* | 1/2016 | Gudu Gantla .......... H04W 4/22 455/404.1 |

FOREIGN PATENT DOCUMENTS

| | | |
|---|---|---|
| CA | 2805607 A1 | 1/2012 |
| CA | 2 812 944 A1 | 4/2012 |
| CA | 2812944 A1 | 4/2012 |
| EP | 2 378 702 A2 | 10/2011 |
| EP | 2378702 A2 | 10/2011 |
| WO | 2011/041926 A1 | 4/2011 |
| WO | 2011041926 A1 | 4/2011 |
| WO | 2013/143051 A1 | 10/2013 |
| WO | 2013143051 A1 | 10/2013 |
| WO | 2014/008360 A2 | 1/2014 |
| WO | 2014008360 A2 | 1/2014 |
| WO | 2014/109968 A1 | 7/2014 |
| WO | 2014109968 A1 | 7/2014 |

\* cited by examiner

METHODS AND SYSTEMS FOR ALLOCATING RESOURCES FROM COMPONENT CARRIERS TO A PUBLIC-SAFETY MOBILE RADIO

BACKGROUND OF THE INVENTION

The need of the public-safety sector for radio-frequency (RF) bandwidth and advanced RF communication technology has greatly increased in recent years, and continues to increase. One way of satisfying this need has been to deploy public-safety radio-access networks (RANs) using advance radio-access technologies (RATs) such as Long-Term Evolution (LTE). Because of the relative scarcity of RF spectrum, some public-safety systems share RF spectrum with commercial systems (such as publicly-accessible mobile-phone networks). In some deployments, the shared RF spectrum is further segmented into respective frequency carriers.

Some of these carriers, because of their respective characteristics, are better suited for public-safety communication than are other carriers. Accordingly, there is a need for allocating resources from component carriers to a public-safety mobile radio.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
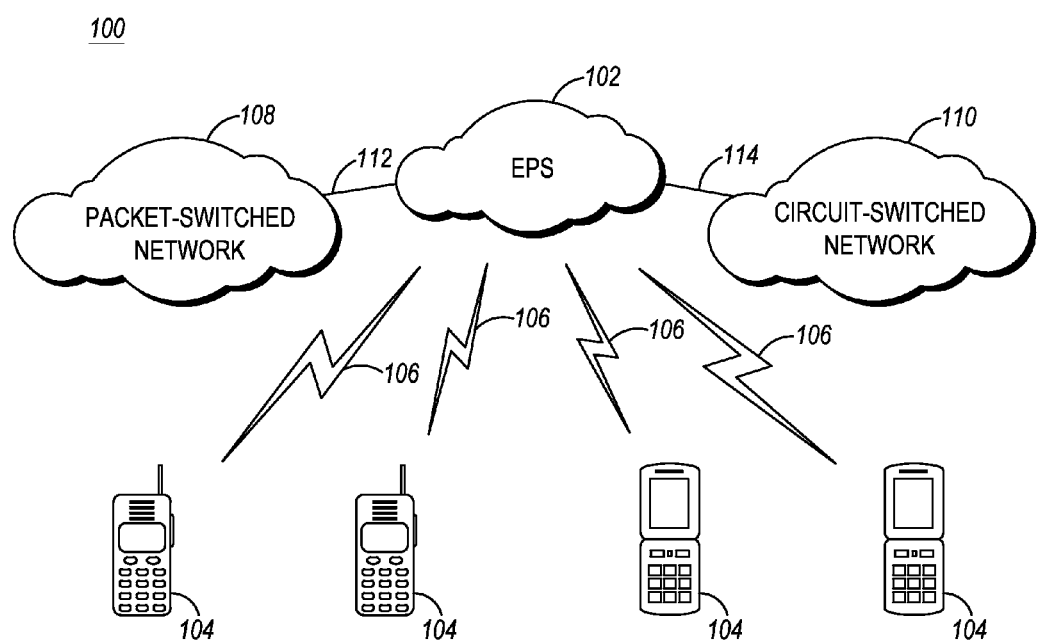
FIG. 1 depicts a communication system, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for allocating resources from component carriers to a public-safety mobile radio. An embodiment takes the form of a process that is carried out by an LTE eNodeB. The eNodeB makes a first determination to allocate resources to a first mobile radio. The eNodeB makes a second determination that the given, i.e., the first, mobile radio is a public-safety mobile radio. In response to making the first and second determinations, the eNodeB selects, based on one or more public-safety-communication criteria, a component carrier from among a plurality of component carriers managed by the eNodeB. The eNodeB allocates resources on the selected eNodeB component carrier to the given mobile radio.

An embodiment takes the form of an eNodeB that includes a communication interface, a processor, and data storage containing instructions executable by the processor for causing the eNodeB to carry out at least the functions described in the preceding paragraph. Moreover, any of the variations and permutations described in the ensuing paragraphs and anywhere else in this disclosure can be implemented with respect to any embodiments, including with respect to any method embodiments and with respect to any system embodiments.

In at least one embodiment, making the second determination includes making the second determination based at least in part on one or more parameters selected from the group consisting of a RAT/Frequency Selection Priority (RFSP) index, a Public Land Mobile Network (PLMN) identifier, an access class identifier, a Home Subscriber Server (HSS) parameter, a Subscription Profile Repository (SPR) parameter, a closed subscriber group identifier, and a configuration parameter from an element manager. In at least one such embodiment, the eNodeB receives the one or more parameters from a network entity communicatively connected to the eNodeB, and making the second determination based at least in part on the one or more parameters includes making the second determination based at least in part on the one or more received parameters.

In at least one embodiment, the eNodeB receives a mobile-radio-type message from a network entity communicatively connected to the eNodeB, the message includes an indication that the network entity has determined that the given mobile radio is a public-safety mobile radio, and making the second determination includes making the second determination based at least in part on the indication in the received mobile-radio-type message. In at least one such embodiment, the network entity is a Mobility Management Entity (MME).

In at least one embodiment, the public-safety communication criteria include spectral characteristics of the respective component carriers, coverage areas of the respective component carriers, frequencies of the respective component carriers, utilization of the respective component carriers, uplink signal strength of the respective component carriers, and/or downlink signal strength of the respective component carriers. In at least one embodiment, the public-safety communication criteria include a type of application requested by the given mobile radio, preconfigured carrier-allocation data, respective compatibilities of the component carriers with LTE Multimedia Broadcast Multicast Services (MBMS), respective compatibilities of the component carriers with LTE Proximity Services (ProSe), respective compatibilities of the component carriers with LTE Group Communication System Enablers (GCSE), and/or respective compatibilities of the component carriers with unicasting. In at least one embodiment, the public-safety communication criteria include a type of an incident, a severity of an incident, a number of mobile radios serving an incident, and/or conditions of the respective component carriers at a location of an incident.

In at least one embodiment, allocating resources on the selected component carrier to the given mobile radio includes making a third determination that a second mobile radio to which the resources are currently allocated is not a public-safety mobile radio, deallocating the resources from the second mobile radio, and allocating the deallocated resources to the given mobile radio.

In at least one embodiment, allocating resources on the selected component carrier includes allocating resources in response to detecting a crisis condition.

In at least one such embodiment, detecting a crisis condition includes receiving a crisis-condition message from a network entity communicatively connected to the eNodeB. In at least one such embodiment, the network entity includes at least one of a fixed network application, a computer-aided dispatch (CAD) application, a maintenance terminal, the given mobile radio, a mobile command application, and a mobile radio other than the given mobile radio.

In at least one other such embodiment, the eNodeB, in response to detecting the crisis condition, deallocates resources assigned to mobile radios in a given set of mobile radios. In at least one such embodiment, none of the mobile radios in the given set of mobile radios is a public-safety mobile radio. In at least one such embodiment, the eNodeB identifies the one or more mobile radios in the given set of mobile radios as not being public-safety mobile radios based a RAT/RFSP index, a PLMN identifier, an access class identifier, an HSS parameter, an SPR parameter, a closed subscriber group identifier, and/or a configuration parameter from an element manager.

In at least one other such embodiment, detecting the crisis condition includes determining that a congestion level of the eNodeB exceeds a threshold congestion level.

In at least one embodiment, the plurality of component carriers includes a primary carrier and one or more secondary carriers. In at least one such embodiment, the selected component carrier is the primary carrier. In at least one other such embodiment, the selected component carrier is a secondary carrier.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

FIG. 1 depicts a communication system, in accordance with at least one embodiment. As shown, communication system 100 includes mobile radios 104 communicatively connected to an evolved packet system (EPS) 102 via respective air-interface links 106. EPS 102 is communicatively connected to a packet-switched network 108 and a circuit-switched network 110 via communication links 112 and 114, respectively.

An example of EPS 102 is discussed below in connection with FIG. 2, though in general, EPS 102 may include typical EPS elements such as eNodeBs, gateways, routers, switches, and the like, arranged, connected, and programmed to provide wireless service to, e.g., mobile radios 104 in a manner that in general is known to those of skill in the relevant art. In one embodiment, consistent with LTE technology, the EPS includes an eNodeB and an Evolved Packet Core (EPC). The EPC may be further divided into standard 3GPP elements, such as a mobility management entity (MME), a serving gateway (S-GW), a packet gateway (P-GW), a policy control and charging rules function (PCRF), and a home subscriber server (HSS), among other possibilities. It should be understood that other terms may be used to refer to EPS 102 (e.g., RAN, core, etc.) and that respective EPS elements may be referred to using other terms (e.g., base station, base station controller, base transceiver station, mobile switching center, home location register, core network, back-end infrastructure, etc.).

EPS 102 and mobile radios 104 may communicate over respective air-interface links 106 according to one or wireless-communication protocols, as is known by those having skill in the relevant art. Example wireless-communication types and/or protocols that could be used in a given implementation include time-division multiple access (TDMA), code-division multiple access (CDMA), frequency-division multiple access (FDMA), orthogonal frequency division multiple access (OFDMA), land mobile radio (LMR), digital mobile radio (DMR), LTE, WiFi, Association of Public-Safety Communications Officials-International (APCO) Project 25 (P25), and Terrestrial Trunked Radio (TETRA), though certainly numerous other examples could be listed. Respective air-interface links 106 could include one or more downlink channels, uplink channels, voice channels, data channels, and/or channels of any other type deemed suitable by those of skill in the relevant art in a given context.

Packet-switched network 108 may take the form of (or include) the global network typically referred to as the Internet. Entities that communicate over packet-switched network 108—entities such as servers, routers, computers, and the like—may be identified by a network address such as an Internet Protocol (IP) address. Moreover, packet-switched network 108 may include one or more network access servers (NASs), gateways, and the like for bridging communications to one or more other entities and/or networks, such as EPS 102 and/or circuit-switched network 110, as representative examples.

Circuit-switched network 110 may take the form of (or include) the circuit-switched telephone network commonly referred to as the public switched telephone network (PSTN), and in general may function to provide circuit-switched communications to various communication entities as is known in the relevant art. Moreover, circuit-switched network 110 may include one or more NASs, gateways, and the like for bridging communications to one or more other entities and/or networks, such as EPS 102 and/or packet-switched network 108, as representative examples.

Either or both of communication links 112 and 114 could include one or more communication devices, networks, connections, switches, bridges, routers, and the like, and could make use of wired and/or wireless forms of communication. One or more communication links instead of and/or in addition to communication links 112 and 114 could be present.

Figure 2:
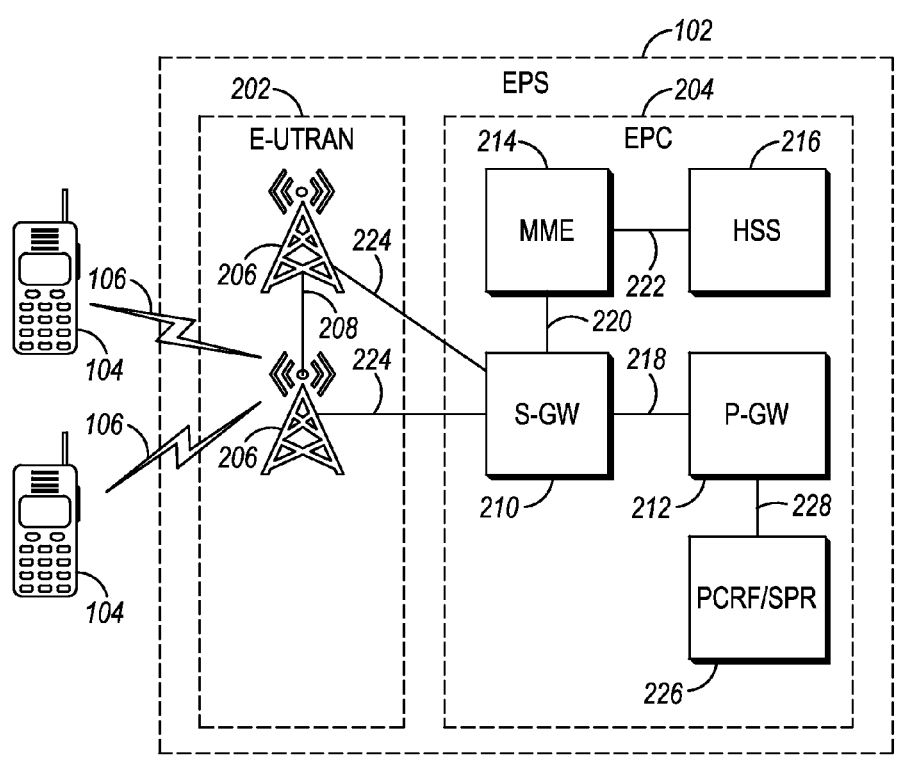
FIG. 2 depicts an Evolved Packet System, in accordance with at least one embodiment.

FIG. 2 depicts an EPS, in accordance with at least one embodiment. As shown, EPS 102 includes an Evolved Universal Mobile Telecommunications System (UMTS) Terrestrial Radio Access Network (E-UTRAN) 202 and an EPC 204.

In the embodiment illustrated in FIG. 2, E-UTRAN 202 includes several eNodeBs 206 that are communicatively interconnected via one or more communications links 208. Mobile radios 104 are communicatively connected to a given one of eNodeBs 206 via respective air-interface links 106, though in general, mobile radios 104 may be communicatively connected to any one or more of eNodeBs 206. As is the case with other air-interface links discussed herein, any one or more of air-interface links 106 may utilize one or more wireless-communication protocols and may include one or more channels of various types.

Moreover, it is noted that some LTE implementations include what is known in the art as carrier-aggregation capability, which allows multiple shared RF carriers to be utilized by a single LTE eNodeB. These carriers can be adjacent in frequency or can be located in separate frequency blocks. When a request for resources is made by an LTE User Equipment (UE) (e.g., a mobile radio 104), the eNodeB can choose on which carrier to allocate resources for the request. Furthermore, although user traffic can be assigned to one of many component carriers, signaling information (e.g., Non-Access Stratum (NAS) signaling) between the EPS and the UE is often conducted over a particular one of the component carriers that are managed by the eNodeB.

EPC 204 is depicted as including an S-GW 210, a P-GW 212, an MME 214, an HSS 216, and a PCRF/subscription profile repository (SPR) 226. S-GW 210 is communicatively connected to P-GW 212 and MME 214 via communication links 218 and 220, respectively, and HSS 216 is communicatively connected to MME 214 via a communication link 222. Additionally, PCRF/SPR 226 is communicatively connected to P-GW 212 via a communication link 228. S-GW 210 may facilitate routing of traffic between E-UTRAN 202 and various entities within EPC 204, and P-GW 212 may facilitate routing of data between EPS 200 and one or more other networks (such as one or more of packet-switched network 108 and circuit-switched network 110 via communication links 110 and 112, respectively), as examples. MME 214 may function to manage connections with one or more mobile radios 104, and HSS 216 may store subscription data for respective mobile radios, among other possibilities. The PCRF component of PCRF/SPR 226 may support and/or carry out functions such as policy-based decision making, flow-based charging, quality of service (QoS) authorizations, perhaps among other functions known to those in the art, while the SPR component of PCRF/SPR 226 may function to store and otherwise manage subscription profiles, among other functions known to those in the art.

EPC 204 may be communicatively connected to E-UTRAN 202 via one or more communication links. In the embodiment illustrated in FIG. 2, S-GW 210 in EPC 204 is communicatively connected to eNodeBs 206 in E-UTRAN 202 via respective communication links 224. As is the case with other communication links discussed herein, any one or more of communication links 208 and 218-224 may take the form of (or include) one or more wired- and/or wireless-communication links, as deemed suitable by those of skill in the relevant art in a given context.

Figure 3:
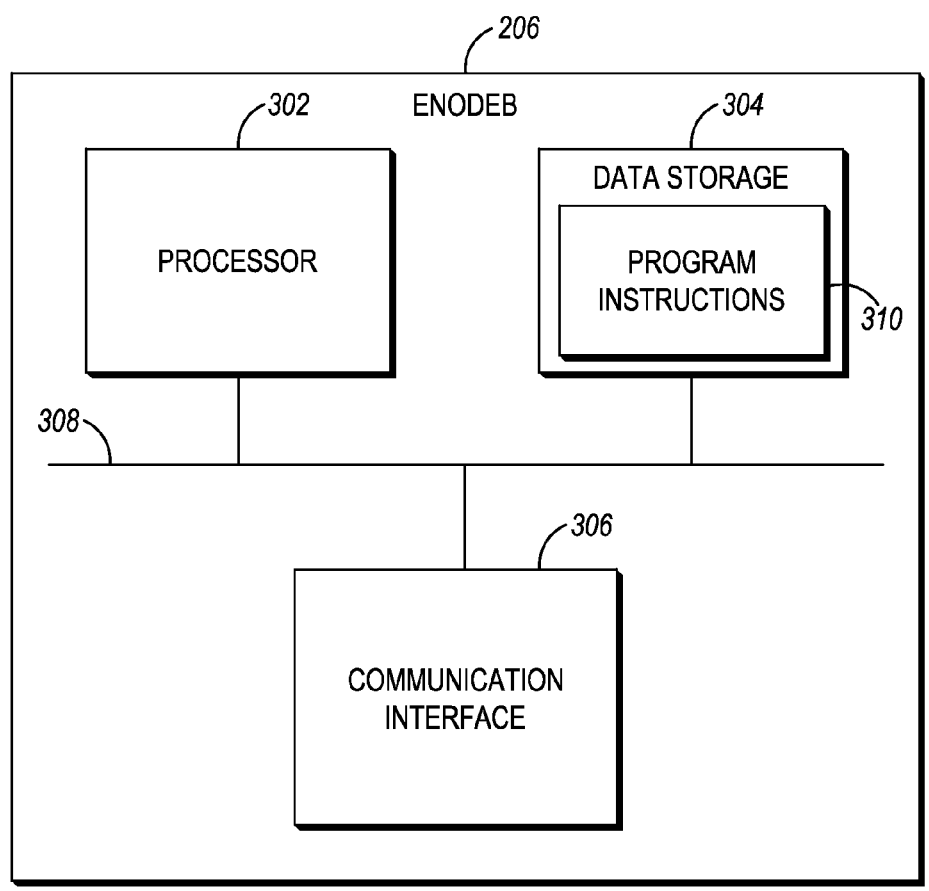
FIG. 3 depicts an Evolved Node B (eNodeB), in accordance with at least one embodiment.

FIG. 3 depicts an eNodeB, in accordance with at least one embodiment. As shown, eNodeB 206 includes a processor 302, data storage 304, and a communication interface 306, each of which are interconnected via a system bus 308. Those having skill in the relevant art will appreciate that eNodeB 206 could have additional and/or different components, and perhaps a different arrangement of components, among many other possible variations that could be listed here.

Processor 302 may include one or more processors of any type deemed suitable by those of skill in the relevant art, some examples including a general-purpose microprocessor and a dedicated digital signal processor (DSP).

Data storage 304 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, data storage 304 contains program instructions 310 executable by processor 302 for carrying out various functions, though data storage 304 may contain different and/or additional data (such as operational data).

In an embodiment in which eNodeB 206 is configured to carry out one or more processes (such as the process described with reference to FIG. 4), program instructions 310 are executable by processor 302 for carrying out those functions. In instances where other entities described herein have a structure similar to that of eNodeB 206, the respective program instructions 310 stored by the respective data storages 304 of those respective devices are executable by their respective processors 302 to carry out functions respectively performed by those devices.

Communication interface 306 may include (i) one or more wireless-communication interfaces for communicating according to one or more of the wireless-communication types and/or protocols mentioned above, and/or one or more other types and/or protocols deemed suitable by those having skill in the relevant art for a given implementation or in a given context and/or (ii) one or more wired-communication interfaces for communicating according to one or more types and/or protocols such as Ethernet, USB, and the like, and/or one or more other types and/or protocols deemed suitable by those having skill in the relevant art for a given implementation or in a given context. As such, communication interface 306 may include any necessary hardware (e.g., chipsets, antennas, Ethernet cards, etc.), any necessary firmware, and any necessary software for conducting one or more forms of communication with one or more other entities.

Figure 4:
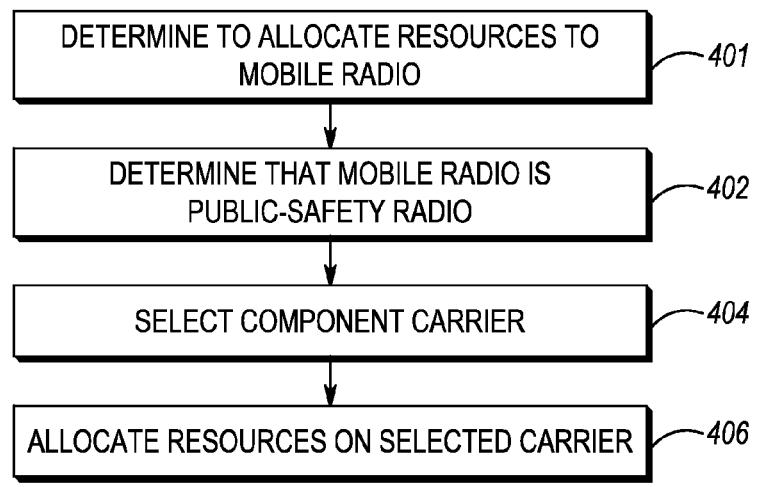
FIG. 4 depicts a flowchart of a method, in accordance with at least one embodiment.

FIG. 4 depicts a flowchart of a method, in accordance with at least one embodiment. Though the method 400 is described as being carried out by eNodeB 206, those of skill in the art will appreciate that any other entity may be capable of carrying out the method.

As shown, method 400 begins at step 401 with eNodeB 206 making a first determination to allocate resources (such as one or more LTE resource blocks) to a first mobile radio. Making the first determination could include eNodeB 206 receiving a request for resources from the given, i.e., the first, mobile radio and/or eNodeB 206 making a determination that the given mobile radio has handed off to eNodeB 206 from another eNodeB, as just some examples.

At step 402, eNodeB 206 makes a second determination that the given mobile radio is a public-safety mobile radio. In at least one embodiment, eNodeB 206 determines that the given mobile radio is a public-safety mobile radio based on one or more parameters. The one or more parameters could include a RAT/RFSP index, a PLMN identifier, an access class identifier, an HSS parameter, an SPR parameter, a closed subscriber group identifier, and/or a configuration parameter from an element manager, among numerous other possibilities. For example, eNodeB 206 may determine that the given mobile radio is a public-safety mobile radio based on a PLMN identifier that the given mobile radio used to attach to eNodeB 206. The eNodeB may receive the one or more parameters from a communicatively-connected network entity such as (for example) S-GW 210, P-GW 212, MME 214, and/or HSS 216, and may determine that the given mobile radio is a public-safety mobile radio based on the one or more received parameters.

In at least one embodiment, eNodeB 206 receives a mobile-radio-type message from a network entity (such as S-GW 210, P-GW 212, MME 214, and/or HSS 216) communicatively connected to the eNodeB 206. The message may include an indication that the network entity has determined that the given mobile radio is a public-safety mobile radio. The eNodeB 206 may then determine that the given mobile radio is a public-safety mobile radio based on the received message. As an example, the network entity may obtain one or more parameters (such as one or more of the parameters described above—i.e., a RAT/RFSP index, a PLMN identifier, an access class identifier, an HSS parameter, an SPR parameter, a closed subscriber group identifier, and/or a configuration parameter from an element manager). The network entity may determine, based on the one or more parameters, that the given mobile radio is a public-safety mobile radio. The network entity may then send an indication to eNodeB 206 that the network entity has determined that the given mobile radio is a public-safety mobile radio.

It should be understood that, for the purpose of this disclosure, a given mobile radio is a public-safety mobile radio by virtue of eNodeB 206 having determined that the given mobile radio is a public-safety mobile radio, and not by virtue of, for example, the mobile radio being marketed as a public-safety mobile radio. A mobile radio that is determined, by eNodeB 206, to be a public-safety radio may utilize technologies typically associated with commercial mobile radios (such as LTE and/or GSM) in addition to or instead of technologies typically associated with public-safety mobile radios.

At step 404, and in response to making the first and second determinations at steps 401 and 402, eNodeB 206 selects, based on one or more public-safety-communication criteria, a component carrier from among a plurality of component carriers managed by eNodeB 206. At step 406, eNodeB 206 allocates resources on the selected eNodeB component carrier to the given mobile radio.

In at least one embodiment, the plurality of component carriers includes a primary carrier and one or more secondary carriers, and the selected component carrier could be the primary carrier and/or a secondary carrier. The plurality of component carriers could take the form of the component carriers used for LTE Advanced carrier aggregation by a respective eNodeB. In at least one embodiment, both the primary carrier and the secondary carriers are used for user traffic, but only the primary carrier is used for signaling between eNodeB 206 and one or more respective mobile radios.

The public-safety communication criteria could include, e.g., the spectral characteristics, coverage areas, frequencies, utilizations, uplink signal strengths, and/or downlink strengths of the respective component carriers, among numerous other possibilities. To illustrate, eNodeB 206 may select and allocate resources on a lower-frequency component carrier from among the plurality of component carriers, i.e., a component carrier of the plurality of component carriers that is lower in frequency relative to other carriers of the plurality of component carriers, because that carrier could provide better in-building coverage for the given mobile radio (as compared to higher-frequency component carriers). Additionally or alternatively, eNodeB 206 may select and allocate resources on a given component carrier because that carrier exhibits a superior signal-to-noise ratio with the public-safety mobile radio. And certainly other examples could be listed as well.

The public-safety communication criteria could include a type of application requested by the given mobile radio and/or preconfigured carrier-allocation data. For example, mobile radios determined to be public-safety mobile radios may each be assigned to a given component carrier. For example, eNodeB 206 may select and allocate resources on a given component carrier because all mobile radios determined by the eNodeB as being public-safety mobile radios are assigned resources on the given component carrier.

The public-safety communication criteria could include respective compatibilities of the component carriers with MBMS, LTE ProSe, LTE GCSE, and/or unicasting, among other possible examples. For example, ProSe allows for temporarily allocating a given LTE component carrier for direct-mode communication between public-safety mobile radios. The eNodeB 206 may select the given ProSe-compatible component carrier such that, if the given public-safety mobile radio were to engage in direct-mode communication, the given mobile radio would already be allocated resources on the component carrier that is used for that direct-mode communication. And certainly other possible implementation examples could be listed here as well.

One or more of the public-safety communication criteria could relate to characteristics of a given incident. For example, the public-safety communication criteria could include a type of an incident, a severity of an incident, a number of mobile radios serving an incident, and/or conditions of the respective component carriers at a location of an incident, among other examples. To illustrate, eNodeB 206 may select and allocate resources on a given component carrier because that component carrier provides a relatively strong Received Signal Strength Indication (RSSI) at a location of an incident (as compared to other component carriers). The characteristics of the incident could be determined automatically, and/or could be provided to eNodeB 206 by an individual (such as a dispatcher and/or an emergency responder, as examples). And certainly other possible implementation examples could be listed here as well.

The eNodeB 206 may allocate the resources on the selected component carrier in response to, for example, the given mobile radio establishing an air-interface link with eNodeB 206 and/or attempting to establish a voice and/or data call, among numerous other possibilities.

In at least one embodiment, allocating resources on the selected component carrier includes allocating resources in response to detecting a crisis condition. Detecting the crisis condition could include, for example, receiving a crisis-condition message from a network entity communicatively connected to eNodeB 206. The network entity could be a fixed network application, a CAD application, a maintenance terminal, the given mobile radio, a mobile command application, a mobile radio other than the given mobile radio, and/or any combination of these, among numerous other possibilities. As another possibility, detecting the crisis condition could include determining that a congestion level of eNodeB 206 exceeds a threshold congestion level. For example, spikes in mobile-radio traffic may indicate a crisis condition. Those of skill in the art will appreciate that detecting a crisis condition may take other forms as well (including any combination of the above-described embodiments).

In addition to allocating resources on one or more component carriers, eNodeB 206 may deallocate resources on one or more carriers (such as the selected component carrier). In at least one embodiment, allocating resources on the selected component carrier to the given mobile radio includes (i) making a determination that a second mobile radio to which the resources are currently allocated is not a public-safety mobile radio, (ii) deallocating the resources from the second mobile radio, and (iii) allocating the deallocated resources to the given mobile radio.

In at least one embodiment, eNodeB 206 deallocates resources in response to detecting a crisis condition. In at least one embodiment, eNodeB 206 deallocates, in response to detecting a crisis condition, resources assigned to mobile radios in a given set of mobile radios (e.g., a set of mobile radios in which none of the mobile radios is a public-safety mobile radio). Such deallocation may be useful in situations where allowing commercial traffic (or other non-public-safety traffic) via eNodeB 206 may pose a security risk—e.g., a situation where a commercial mobile radio might be used to remotely trigger an incendiary device. The eNodeB 206 could identify the one or more mobile radios as not being public-safety mobile radios based on a RAT/RFSP index, a PLMN identifier, an access class identifier, an HSS parameter, an SPR parameter, a closed subscriber group identifier, and/or a configuration parameter from an element manager, among other possibilities.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method carried out by a Long-Term Evolution (LTE) Evolved Node B (eNodeB), the method comprising:
    making a first determination to allocate resources to a given mobile radio;
    making a second determination that the given mobile radio is a public-safety mobile radio;
    in response to making the first and second determinations, selecting, based on one or more public-safety-communication criteria, a component carrier from among a plurality of component carriers managed by the eNodeB; and
    allocating resources on the selected eNodeB component carrier to the given mobile radio;
    receiving a mobile-radio-type message from a network entity communicatively connected to the eNodeB, the message comprising an indication that the network entity has determined that the given mobile radio is a public-safety mobile radio, wherein making the second determination comprises making the second determination based at least in part on the indication in the received mobile-radio-type message.

2. The method of claim 1, wherein making the second determination comprises making the second determination based at least in part on one or more parameters selected from the group consisting of a Radio Access Technology (RAT)/Frequency Selection Priority (RFSP) index, a Public Land Mobile Network (PLMN) identifier, an access class identifier, a Home Subscriber Server (HSS) parameter, a Subscription Profile Repository (SPR) parameter, a closed subscriber group identifier, and a configuration parameter from an element manager.

3. The method of claim 2, further comprising receiving the one or more parameters from a network entity communicatively connected to the eNodeB, wherein making the second determination based at least in part on the one or more parameters comprises making the second determination based at least in part on the one or more received parameters.

4. The method of claim 1, wherein the network entity comprises a Mobility Management Entity (MME).

5. The method of claim 1, wherein the public-safety communication criteria comprise one or more of: spectral characteristics of the respective component carriers, coverage areas of the respective component carriers, frequencies of the respective component carriers, utilization of the respective component carriers, uplink signal strength of the respective component carriers, and downlink signal strength of the respective component carriers.

6. The method of claim 1, wherein the public-safety communication criteria comprise one or more of: a type of application requested by the given mobile radio, preconfigured carrier-allocation data, respective compatibilities of the component carriers with Multimedia Broadcast Multicast Services (MBMS), respective compatibilities of the component carriers with LTE Proximity Services (ProSe), respective compatibilities of the component carriers with LTE Group Communication System Enablers (GCSE), and respective compatibilities of the component carriers with unicasting.

7. The method of claim 1, wherein the public-safety communication criteria comprise one or more of: a type of an incident, a severity of an incident, a number of mobile radios serving an incident, and conditions of the respective component carriers at a location of an incident.

8. The method of claim 1, wherein allocating resources on the selected component carrier to the given mobile radio comprises:
making a third determination that a second mobile radio to which the resources are currently allocated is not a public-safety mobile radio;
deallocating the resources from the second mobile radio; and
allocating the deallocated resources to the given mobile radio.

9. The method of claim 1, wherein allocating resources on the selected component carrier comprises allocating resources in response to detecting a crisis condition.

10. The method of claim 9, wherein detecting the crisis condition comprises receiving a crisis-condition message from a network entity communicatively connected to the eNodeB.

11. The method of claim 10, wherein the network entity comprises at least one of a fixed network application, a computer-aided dispatch (CAD) application, a maintenance terminal, the given mobile radio, a mobile command application, and a mobile radio other than the given mobile radio.

12. The method of claim 9, further comprising:
in response to detecting the crisis condition, deallocating resources assigned to mobile radios in a given set of mobile radios.

13. The method of claim 12, wherein none of the mobile radios in the given set of mobile radios is a public-safety mobile radio.

14. The method of claim 13, further comprising identifying the one or more mobile radios in the given set of mobile radios as not being public-safety mobile radios based on one or more of: a Radio Access Technology (RAT)/Frequency Selection Priority (RFSP) index, a Public Land Mobile Network (PLMN) identifier, an access class identifier, a Home Subscriber Server (HSS) parameter, a Subscription Profile Repository (SPR) parameter, a closed subscriber group identifier, and a configuration parameter from an element manager.

15. The method of claim 9, wherein detecting the crisis condition comprises determining that a congestion level of the eNodeB exceeds a threshold congestion level.

16. The method of claim 1, wherein the plurality of component carriers comprises a primary carrier and one or more secondary carriers.

17. The method of claim 16, wherein the selected component carrier is the primary carrier.

18. The method of claim 16, wherein the selected component carrier is a secondary carrier.

* * * * *